United States Patent
Blankenhorn

(10) Patent No.: US 6,477,827 B2
(45) Date of Patent: Nov. 12, 2002

(54) AIR-PERMEABLE TRANSPORT BELT FOR TRANSPORTING A FIBER STRAND TO BE CONDENSED AND METHOD OF MAKING SAME

(75) Inventor: Peter Blankenhorn, Gerstetten (DE)

(73) Assignees: Fritz Stahlecker, Bad Verberkingen (DE); Hans Stahlecker, Suessen (DE)

( * ) Notice: Subject to any disclaimer, the term of this patent is extended or adjusted under 35 U.S.C. 154(b) by 81 days.

(21) Appl. No.: 09/725,210

(22) Filed: Nov. 29, 2000

(65) Prior Publication Data

US 2001/0003324 A1 Jun. 14, 2001

(30) Foreign Application Priority Data

Dec. 10, 1999  (DE) .......................................... 199 59 563

(51) Int. Cl.$^7$ ............................................... D01H 13/04
(52) U.S. Cl. ............................. 57/315; 19/150; 19/236; 19/244
(58) Field of Search ...................... 57/264, 304, 315, 57/328, 333; 19/150, 236–250, 252, 263, 286, 287, 288, 304–308; 156/137–140, 143; 162/358.2, 900, 902–904; 198/689.1, 846, 847; 226/95, 170–173; 428/131, 136, 137

(56) References Cited

U.S. PATENT DOCUMENTS

| | | | |
|---|---|---|---|
| 2,659,936 A | * 11/1953 | Sandelin ....................... 19/248 |
| 5,600,872 A | * 2/1997 | Artzt et al. .................... 19/244 |
| 6,073,314 A | * 6/2000 | Barauke ....................... 19/246 |
| 6,108,873 A | 8/2000 | Barauke ....................... 19/236 |
| 6,116,156 A | * 9/2000 | Schiel et al. ............. 162/358.2 |
| 6,170,126 B1 | * 1/2001 | Stahlecker .................... 19/246 |
| 6,237,317 B1 | * 5/2001 | Stahlecker .................... 57/315 |
| 6,263,654 B1 | * 7/2001 | Stahlecker .................... 57/315 |

FOREIGN PATENT DOCUMENTS

DE           198 46 268         10/1999

* cited by examiner

*Primary Examiner*—Danny Worrell
*Assistant Examiner*—Gary L. Welch
(74) *Attorney, Agent, or Firm*—Crowell & Moring LLP

(57) ABSTRACT

In order to transport a fiber strand to be pneumatically condensed over a suction slit of a condensing zone of a spinning machine, a transport belt is provided which comprises, at least in the effective area of the suction slit, a porous area. The porous area can, for example, be created by dissolving granulate components from a fine-grained granulate blend.

24 Claims, 2 Drawing Sheets

AIR-PERMEABLE TRANSPORT BELT FOR TRANSPORTING A FIBER STRAND TO BE CONDENSED AND METHOD OF MAKING SAME

BACKGROUND AND SUMMARY OF THE INVENTION

This application claims the priority of German Patent Application No. 199 59 563.1, filed in Germany, Dec. 10, 1999, the disclosure of which is expressly incorporated by reference herein.

The present invention relates to an air-permeable transport belt for transporting a fiber strand to be pneumatically condensed over a suction slit of a condensing zone of a spinning machine.

For the pneumatic condensing of a fiber strand leaving a drafting unit of a spinning machine it is important that the fiber strand is transported in the condensing zone disposed on an air-permeable transport element and still in a twist-free state and having fibers lying essentially parallel to one another, and that in the condensing zone an air stream is generated which flows through the transporting element, which air stream, depending on its width and/or direction determines the degree of condensing and which positions the fibers transversely to the transport direction and thus bundles or condenses the fiber strand. In the case of a fiber strand condensed in this way, a spinning triangle does not occur when twist is being imparted, so that the thread produced is more even, more tear-resistant and less hairy.

A transport belt of the above mentioned type is described in connection with a condensing arrangement in German published patent application 198 46 268 (corresponding U.S. Pat. No. 6,108,873. The transport belt is, in this case, perforated and is designed as a mesh belt or a sieve foil or advantageously as a close-meshed woven belt, which is driven glidingly over a hollow profile which comprises the suction slit.

In the design of a woven belt it is advantageously possible to provide a plurality of openings in a very small space, so that a very homogenous air stream is generated. At the points of intersection between the warp threads and the weft threads, tiny open pores form in which the fibers can adhere. The trapped fibers can, in time, block the perforations and thus impair the condensing effect. In the case of the mesh belt or the sieve foil variations, the above mentioned disadvantage is avoided, but the distance between the holes is significantly larger than in the case of the woven belt, so that the air stream is less homogenous.

It is an object of the present invention to produce a transport belt of the above mentioned type, in which the risk of a reduction in air-permeability with increasing operating time is avoided to a great extent, and in which an entirely homogenous air stream is possible at the same time.

This object has been achieved in accordance with the present invention in that the normally smooth transport belt has, at least in its effective area of the suction slit, a porous area.

The phrase "porous area" can be taken not to mean a relatively coarse perforation, which occurs by stamping or as is the case with woven belts, but rather it is a porosity which is present in, for example, air-permeable plastic bags.

In order to produce a transport belt in accordance with the present invention, various production methods are possible:

A fine-grained, almost dust-like synthetic granulate can be sintered, whereby the granulate, just below its melting temperature, is pressed under pressure into a mould. Air can then pass through the baked granulate grains.

Alternatively, various kinds of granulate can be sintered together, for example granulates of polyamide and polystyrene, whereby a graining of approximately 50 μm is ideal. The polystyrene part is subsequently dissolved by using a solvent, so that in this case also, a free airflow through the transport belt occurs.

Granulate blends with different melting points can also be melted together, whereby a synthetic with a higher melting temperature and a plastic with a lower melting temperature are mixed together in a fine-grain granulate, for example a polyamide with a polycarbonate. Injection into the mould takes place at a temperature which lies between the two melting points. The granulate with the higher melting point is subsequently chemically dissolved.

It is also possible to inject a plastic with an expanding agent, similar to the process in the production of sponges. Due to the expanding agent, hollow spaces occur, whereby open pores can be created after a short dissolving phase or by another method. Thus an airflow is also generated in this case.

As an overall very wide air stream cross section is possible with a porosity, despite extremely fine individual air entry cross sections, a very homogenous air stream is generated. As the open pores which occur in the case of a woven belt are avoided, the risk of a reduction in porosity occurring during operating time is significantly reduced.

It has been shown that it is very favorable when the transport belt is only a few tenths of a millimeter thick, preferably less than 0.5 mm. The fiber strand to be condensed thus lies almost directly on the suction slit, which results in a good condensing effect.

It is sufficient when the porous area is only located there where the suction slit has to be covered over. A border zone can thus be provided on both sides of the porous area, which zones are not porous and which permit the drive by means of a friction roller or the like.

As a plurality of spinning points are arranged closely adjacent to one another in a spinning machine, it is in certain circumstances purposeful when the transport belt extends over a plurality of spinning stations. It can then be provided that a relatively narrow porous area is arranged to each spinning station.

Other objects, advantages and novel features of the present invention will become apparent from the following detailed description of the invention when considered in conjunction with the accompanying drawings.

DETAILED DESCRIPTION OF THE DRAWINGS

Figure 1:
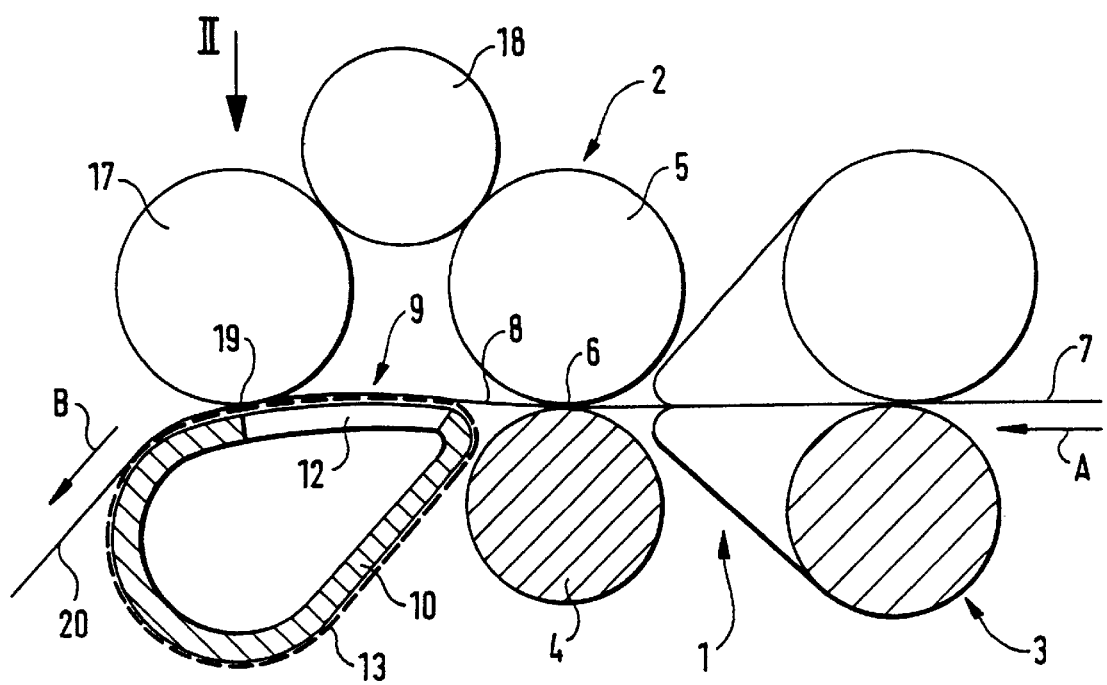
FIG. 1 is a partly sectional side view of a first embodiment of a condensing apparatus comprising a transport belt according to the present invention.
Figure 2:
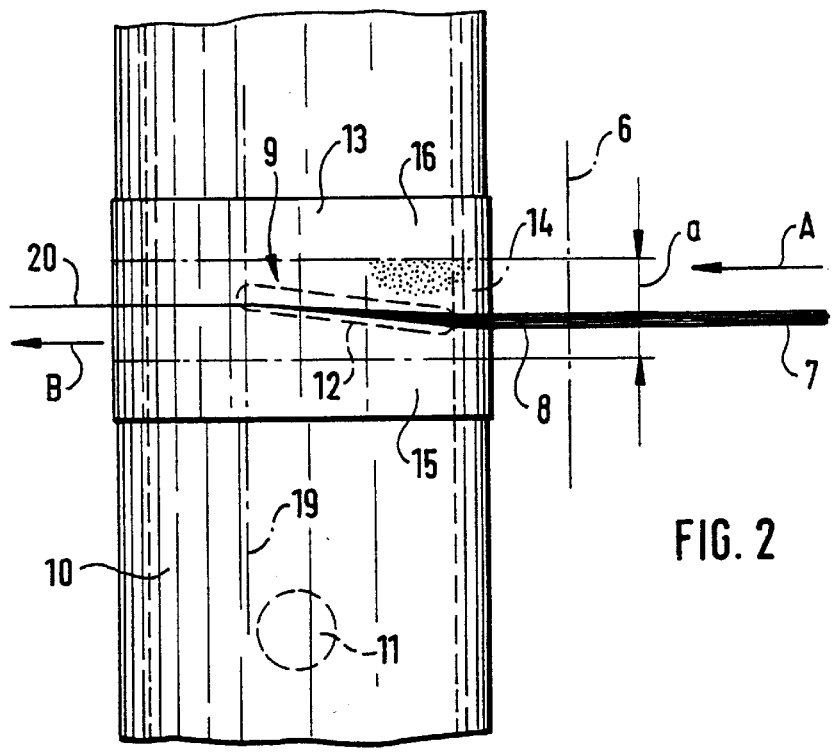
FIG. 2 is a view in the direction of the arrow II of FIG. 1 onto the condensing zone.

In the embodiment according to FIGS. 1 and 2, only the area of a front roller pair 2 and of an apron roller pair 3 upstream thereof are shown of a drafting unit 1 of a spinning machine. The front roller pair 2 comprises in a known way a driven front bottom roller 4 extending in machine longitudinal direction, to which front bottom roller 4 one front top roller 5 per spinning station is arranged. By means thereof, a front nipping line 6 is formed, at which the drafting zone of the drafting unit 1 is ended.

A sliver or roving 7 is guided through the drafting unit 1 in transport direction A and drafted to the desired degree. Directly downstream of the front nipping line 6 is a drafted, but still twist-free fiber strand 8.

A condensing zone 9 lies downstream of the drafting unit 1 for pneumatically condensing the fiber strand 8, which is still in a twist-free state. A hollow profile 10, extending over a plurality of spinning stations, preferably a machine section, is arranged at the condensing zone 9, which hollow profile 10 is connected by means of a vacuum conduit 11 to a vacuum source (not shown). A suction slit 12 is arranged at each condensing zone 9, which suction slit 12 extends essentially in transport direction A, but preferably somewhat inclined thereto, as can be seen in FIG. 2.

The outer contour of the hollow profile 10 is designed at least in the area of the suction slit 12 as a sliding surface for an air-permeable transport belt 13, which is driven to circulate and to transport the fiber strand 8 over the suction slit 12 and through the condensing zone 9. The air-permeability of the transport belt 13 is achieved by means of a porous area 14 which is described below, and which is located preferably in the area of the suction slit 12, whose effective width (a) is of such dimensions that the suction slit 12 is completely covered. On each side of the porous area 14 there is a border zone 15 and 16, which serves for the friction drive of the transport belt 13.

The transport belt 13 is driven by a nipping roller 17, which in turn receives its drive from the front top roller 5 by means of a transfer roller 18. The nipping roller 17 forms together with the transport belt 13 and the hollow profile 10 a nipping line 19, which borders the condensing zone 9 on its exit side and which, regarding the thread 20 to be spun, effects a twist block, preventing the imparted spinning twist from running back to the condensing zone 9.

The thread 20 is fed directly downstream of the condensing zone 9 in delivery direction B to a twist device (not shown), for example, a ring spindle.

The condensing of the fiber strand 8 serves the purpose of preventing the formation of a spinning triangle at the nipping line 19, to which point the twist runs back. The spun thread 20 is thus more even, more tear-resistant and less hairy.

The transport belt 13 is a relatively thin, flexible belt of less than 0.5 mm thickness, whereby the porous area 14 is formed not by a relatively coarse perforation, but rather by a very fine porosity. As already mentioned above, the porous area 14 can be made from fine-grained, preferably synthetic granulates, which is, for example, sintered. The porosity can be created in that granulate components are dissolved from a granulate blend.

In the case of a transport belt 13 of this kind, the airflow is very homogenous, whereby the surface is also sufficiently smooth and even, so that there is hardly any danger that fiber fly will settle and reduce porosity with the passing of time.

Figure 3:
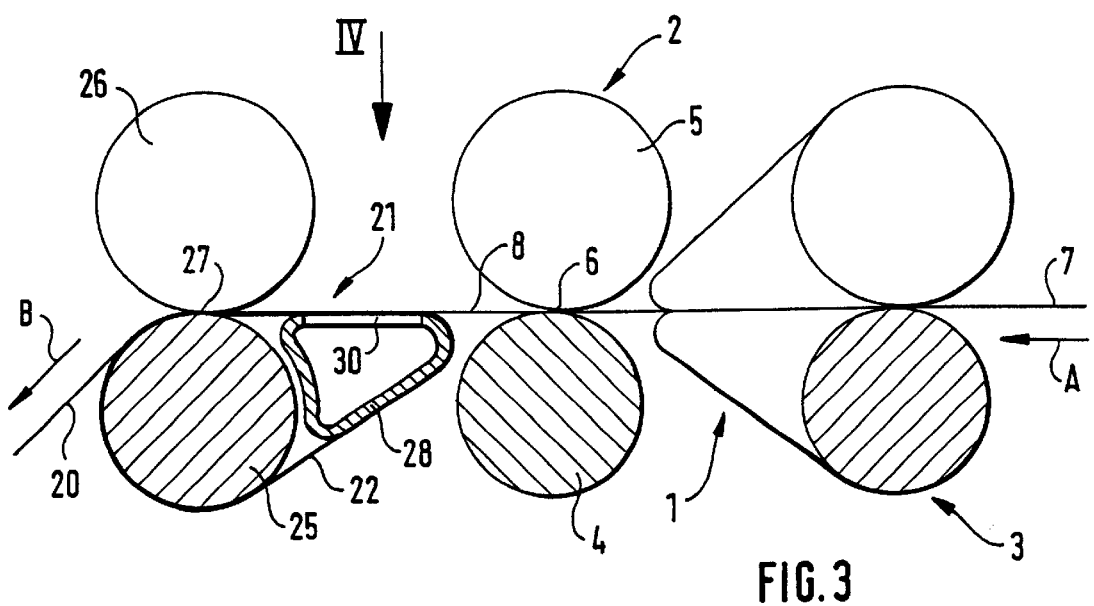
FIG. 3 is a partly sectional side view of a second embodiment of a condensing apparatus comprising a transport belt according to the present invention.
Figure 4:
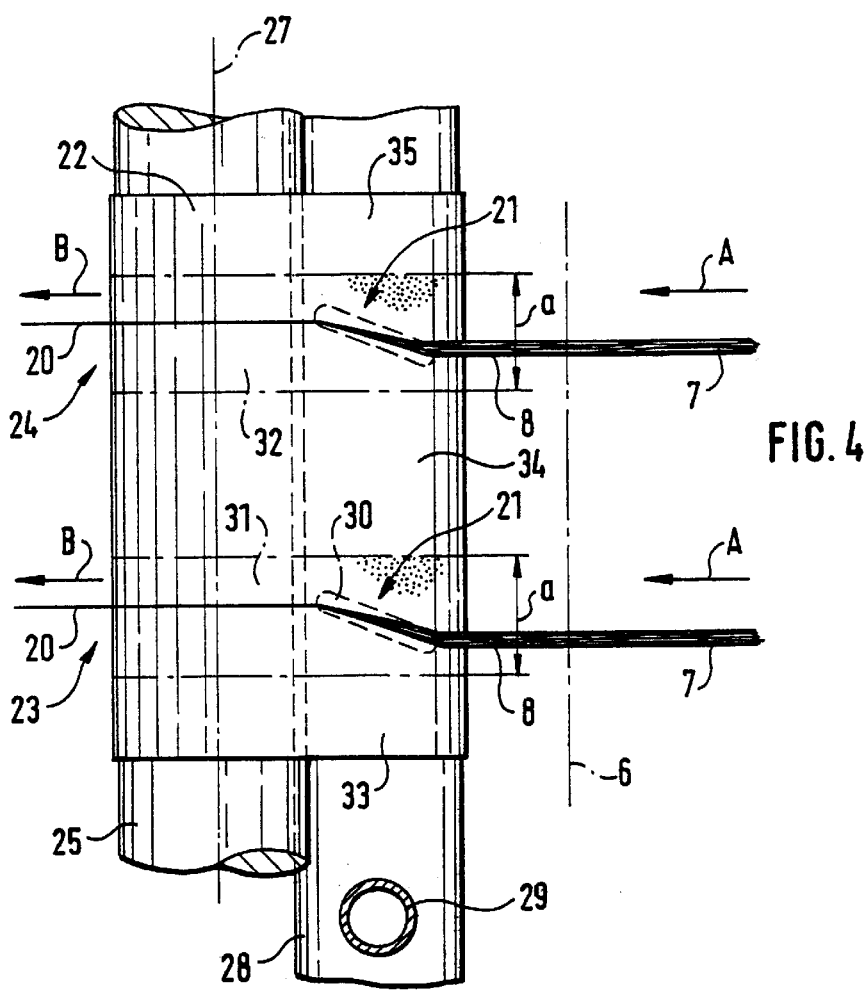
FIG. 4 is a view in the direction of the arrow IV of FIG. 3 onto the condensing zone of two adjacent spinning stations.

In the embodiment according to FIGS. 3 and 4, a slightly different embodiment of an apparatus for condensing is shown for a similarly designed air-permeable transport belt 22. Insofar as the components are identical to the previously described embodiment, reference numbers are retained so that a repeat description is superfluous.

In the embodiment according to FIGS. 3 and 4, a slightly differently designed condensing zone 21 adjoins the front nipping line 6 of the drafting unit 1 downstream thereof. This time, an air-permeable transport belt 22 is provided which extends over a plurality, preferably two, spinning stations 23 and 24. It is, of course, also possible that the transport belt 22 extends only over a single spinning station.

The transport belt 22 does not travel over a stationarily arranged hollow profile as in FIGS. 1 and 2, but rather it loops around a driven delivery roller 25, which runs preferably in machine longitudinal direction. One nipping roller 26 is arranged per spinning station 23,24 to the delivery roller 25, which nipping roller 26 again with the delivery roller 25 forms a nipping line 27 which defines the twist block.

Alternatively it can also be provided that the transport belt 22 does not loop around the delivery roller 25, but rather around the nipping roller 26 which is driven by the delivery roller 25.

The transport belt 22 runs over a suction box 28, which is connected by means of a vacuum conduit 29 with a vacuum source (not shown). A suction slit 30 is again provided per spinning station 23,24, over which suction slit 30 the transport belt 22 transports the fiber strand 8 to be condensed.

The transport belt 22 also comprises per suction slit 30 a porous area 31,32, which is bordered in this case by non-porous edge zones 33,34 and 35 and which serve the friction drive. The porous areas 31,32, having an effective width a, cover the relevant suction slit 30 completely and are made in a similar process as mentioned above.

The transport belt 22 according to the present generation generates a very homogenous air stream for condensing the fiber strand 8, whereby the surface of the transport belt 22 normally does not become blocked with fiber fly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. An air-permeable smooth transport belt for use in combination with a suction slit of a condensing zone of a spinning machine for transporting a fiber strand over the suction slit, wherein the transport belt comprises a porous area at least in an effective area of the suction slit, and wherein the porous area is made from a fine-grained synthetic granulate.

2. A transport belt according to claim 1, wherein the granulate is sintered.

3. A transport belt according to claim 2, wherein the transport belt, include dissolved granulate components from a granulate blend which form the porous area.

4. A transport belt according to claim 2, wherein said transport belt has a plurality of porous areas, each of which is arranged at a spinning station.

5. A transport belt according to claim 2, wherein said transport belt has a plurality of porous areas, each of which is arranged at a spinning station.

6. A transport belt according to claim 1, wherein the transport belt includes dissolved granulate components from a granulated blend which forms the porous area.

7. A transport belt according to claim 6, wherein the transport belt thickness measures less than 0.5 mm.

8. A transport belt according to claim 6, wherein said transport belt has a plurality of porous areas, each of which is arranged at a spinning station.

9. A transport belt according to claim 1, wherein transport includes open pores in the porous area created from hollow spaces formed by an expanding agent.

10. A transport belt according to claim 9, wherein the transport belt thickness measures less than 0.5 mm.

11. A transport belt according to claim 9, wherein edge zones, which permit a friction drive, are provided on both sides of the porous areas of the transport belt.

12. A transport belt according to claim 9, wherein said transport belt has a plurality of porous areas, each of which is arranged at a spinning station.

13. A transport belt according to claim 1, wherein the transport belt thickness measures less than 0.5 mm.

14. A transport belt according to claim 13, wherein edge zones, which permit a friction drive, are provided on both sides of the porous areas of the transport belt.

15. A transport belt according to claim 14, wherein said transport belt has a plurality of porous areas, each of which is arranged at a spinning station.

16. A transport belt according to claim 13, wherein said transport belt has a plurality of porous areas, each of which is arranged at a spinning station.

17. A transport belt according to claim 1, wherein the transport belt thickness measures less than 0.5 mm.

18. A transport belt according to claim 1, wherein edge zones, which permit a friction drive, are provided on both sides of the porous areas of the transport belt.

19. A transport belt according to claim 1, wherein said transport belt has a plurality of porous areas, each of which is arranged at a spinning station.

20. A method of making an air-permeable smooth transport belt for transporting a fiber strand over a suction slit of a condensing zone of a spinning machine, wherein the transport belt comprises a porous area at least in an effective area of the suction slit, said method comprising:

forming a base belt of plastic material, and treating a section of the base belt to form the porous area, wherein said treating includes forming said porous area as a granulate and sintering the porous area with the granulate pressed under pressure into a mold at a temperature just below melting temperature of the granulate.

21. A method of making an air-permeable smooth transport belt for transporting a fiber strand over a suction slit of a condensing zone of a spinning machine, wherein the transport belt comprises a porous area at least in an effective area of the suction slit, said method comprising:

forming a base belt of plastic material, and treating a section of the base belt to form the porous area, wherein said belt is formed with multiple granulates, and wherein said treating includes sintering the granulates together and subsequently dissolving one of said granulates with a solvent.

22. A method according to claim 21, wherein said multiple granulates includes granulates of polyamide and polystyrene, and wherein said subsequent dissolving includes dissolving said polystyrene.

23. A method of making an air-permeable smooth transport belt for transporting a fiber strand over a suction slit of a condensing zone of a spinning machine, wherein the transport belt comprises a porous area at least in an effective area of the suction slit, said method comprising:

forming a base belt of plastic material, and treating a section of the base belt to form the porous area, wherein said belt is formed with two granulates which fix together with have respective different melting temperatures, wherein said granulates are injected into a mold at a temperature in an immediate respect melting temperatures, and wherein the granulate with a higher melting temperature is subsequently chemically dissolved.

24. A method according to claim 23, wherein said two granulates are made of a polyamide and a polycarbonic.

* * * * *